INVENTOR.
ANTON F. ERICKSON
BY
HIS ATTORNEY

April 3, 1962    A. F. ERICKSON    3,027,981
BRAKE ACTUATOR

Filed July 15, 1959    2 Sheets-Sheet 2

INVENTOR.
ANTON F. ERICKSON
BY
HIS ATTORNEY

United States Patent Office 3,027,981
Patented Apr. 3, 1962

3,027,981
BRAKE ACTUATOR
Anton F. Erickson, Dayton, Ohio, assignor to General Motors Corporation, Detroit, Mich., a corporation of Delaware
Filed July 15, 1959, Ser. No. 827,298
5 Claims. (Cl. 188—78)

This invention relates to a vehicle drum brake and more particularly to an externally mounted hydraulic wheel cylinder, and a lever arrangement for actuating a vehicle drum brake.

Greater speed and weight of modern vehicles require an increased capacity of motor vehicle brakes. Where vehicle braking capacity has not been adequate higher operating temperatures have been the result. Under severe braking conditions, the hydraulic fluid for actuating of the brakes has become dangerously overheated.

Accordingly, this invention intends to overcome some of the disadvantages caused under severe braking, this being accomplished by placing the hydraulic wheel cylinders external of the vehicle brake drum. A suitable linkage is also employed to transmit the thrust from the wheel cylinder for actuation of the brake force within the rotating drum.

It is an object of this invention to mount the wheel cylinder externally of the brake drum to eliminate danger of overheating of the hydraulic fluid.

It is another object of this invention to mount the wheel cylinder on the backing plate or cover plate on the opposite side from the brake shoes which engage the inner periphery of the rotating brake drum.

It is a further object of this invention to employ a means for transmitting the force from the actuating means external of the brake drum through a free-floating rolling action in a lever arrangement for actuation of the vehicle brakes.

It is a further object of this invention to provide hydraulic means and manual means in combination for actuation of the vehicle brakes through a suitable anti-friction lever arrangement to the inner portion of the vehicle braking means.

The objects of this invention are accomplished by placing the hydraulic wheel cylinder on the external side of the backing plate of a vehicle drum brake. The hydraulic wheel cylinder is mounted in a position so that heat conducted to the hydraulic wheel cylinder may be radiated to the air when the vehicle is in motion. The wheel cylinder transmits its force through a push-rod connected to a scissor-like lever arrangement which has a free-floating mounting within the backing plate and the vehicle drum brake. The two levers operate in the rolling manner against each other and thrust the brake shoes radially outward against the rotating brake drum. The device provides equal transmission of forces to both shoes and equal braking regardless of rotation of the vehicle brake drum.

The manual means for actuation of the vehicle brakes operates through the same scissor-like lever arrangement. The force is transmitted from a cable to an actuating link bearing against one of the levers which may also be actuated by the hydraulic wheel cylinder.

Further objects and advantages of the present invention will be apparent from the following description, reference being had to the accompanying drawings wherein preferred embodiments of the present invention are clearly shown.

Figure 1:
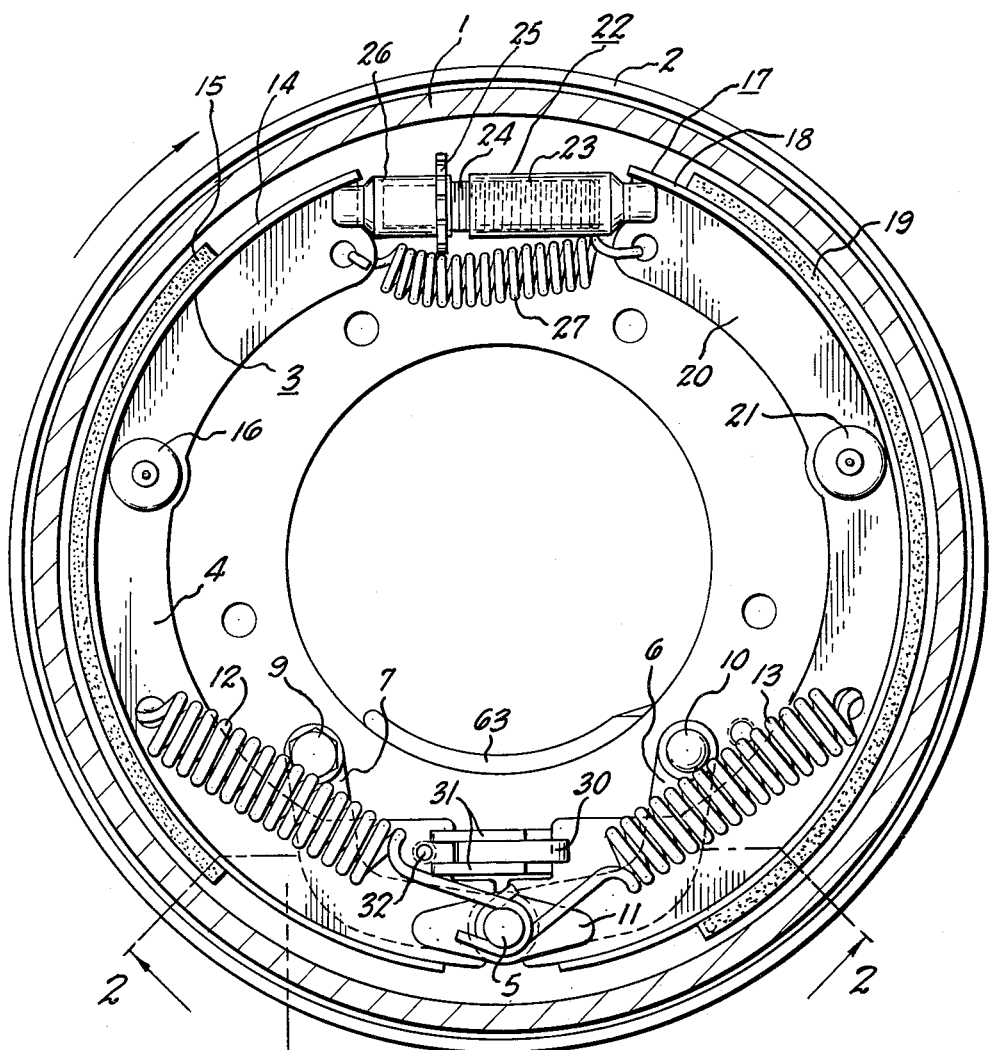
FIGURE 1 is a cross section view through the brake drum showing the relationship of the various parts within the vehicle brake drum.

The braking structure as illustrated in this invention includes two brake shoes for frictionally engaging the inner periphery of a rotating drum. The drum and the brake shoes and adjustable strut are of a conventional type brake. There is no hydraulic wheel cylinder within the rotating drum for the actuation of the vehicle brakes. This has been been mounted externally at a point opposite of the backing plate in the vehicle braking structure. The general structure and the relation of the various parts within the brake drum are shown in FIGURE 1.

A rotating brake drum 1 is mounted adajcent to and concentric with the backing plate 2. As shown in the FIGURE 1 according to the direction of the rotation arrow, the primary shoe is indicated by number 3. In the retracted position, the webbing 4 of the primary shoe 3 rests against the anchor pin 5. The anchor pin 5 includes a bifurcated portion 6 and 7 extending from the base portion of pin 5. The portions 6 and 7 are fastened to the backing plate 2 by means of the bolt 9 and the rivet 10. A washer 11 is spaced between the cooperative adjacent ends of the brake shoes and the retraction springs 12 and 13. The retraction spring 12 extends to a point where it engages the webbing 4 of the primary shoe 3. The webbing 4 of the primary shoe 3 is fastened to the arcuate portion 14 of the primary shoe. The arcuate portion 14 provides a mounting surface for the frictional material 15 which engages the inner periphery of the rotating drum 1. A hold-down pin assembly is shown at 16 which maintains the primary brake shoe 3 in a resilient mounted position.

The secondary brake shoe 17 is also provided with an arcuate portion 18 for mounting of the frictional material 19. The frictional material 19 also engages the inner periphery of the rotating drum 1. The secondary brake shoe 17 is supported by the webbing 20 which is resiliently mounted on a pin assembly 21. The two cooperative adjacent ends of the primary brake shoe 3 and the secondary brake shoe 17 are connected by an adjustable strut 22. The adjustable strut includes a sleeve 23 having a cylindrical opening which is internally threaded. This cylindrical opening receives the screw member 24 which is fastened to a ratchet wheel 25. The opposite end of the screw 24 has a smooth cylindrical shank portion which is received within a mating cylindrical opening in sleeve 26. The end of the sleeve 26 has a slotted portion where it engages the brake shoe webbing 4 of the primary brake shoe 3. The end of the sleeve member 23 opposite the cylindrical opening is provided with a slotted portion for reception of the secondary brake shoe webbing 20. A constant contact is maintained between the primary brake shoe webbing 4 and a secondary brake shoe webbing 20 and the cooperating ends of the adjustable strut 22 by means of the tension spring 27.

The end of the secondary brake shoe 17 engages the anchor pin 5 in the same manner as the corresponding end of the primary shoe 3. A biasing force is maintained between the secondary brake shoe webbing 20 and the anchor pin 5 by the retraction spring 13. This spring engages a perforation in the secondary brake shoe webbing 20 and also extends around the anchor pin 5. Retraction spring 12 returns the primary brake shoe 3 to the retracted position.

The two levers for actuating of the vehicle brakes are shown in FIG. 1. The lever 30 actuates the secondary shoe 17 and the lever 31 actuates the primary shoe. A guide pin 32 is shown in the primary brake shoe webbing 4 which the lever 31 straddles to maintain an alignment with the actuating lever normal to the brake shoe webbing 4.

Figure 2:
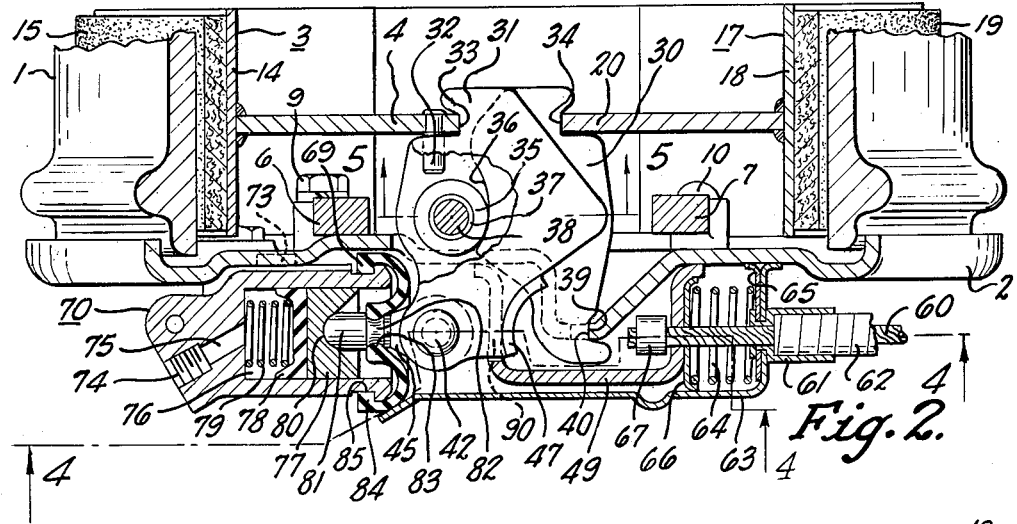
FIGURE 2 is a cross section view taken on line 2—2 of FIGURE 1. This view shows the brake actuating linkage in a retracted position.
Figure 3:
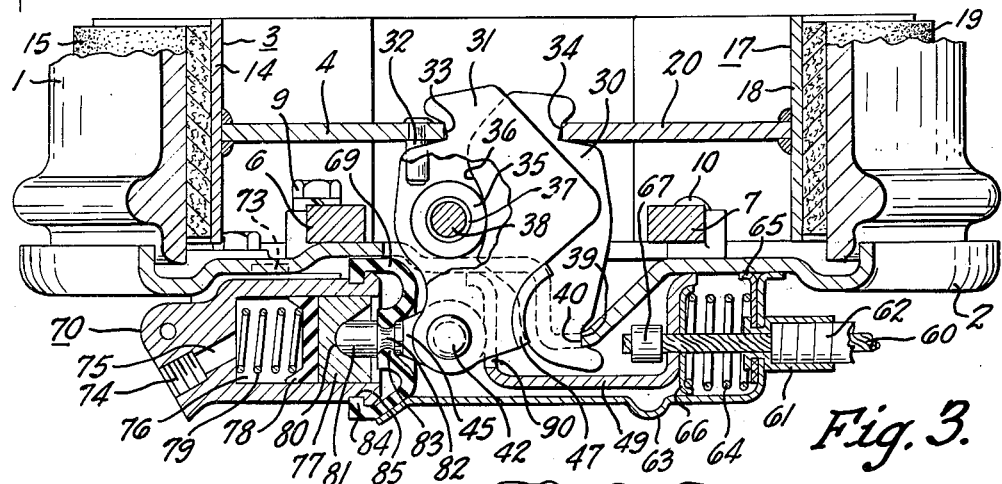
FIGURE 3 is a similar cross section view to that of FIGURE 2 except the braking means is shown in an actuated position instead of a retracted position.

FIGURE 2 illustrates the actuating means employed in the vehicle drum brake. The rotating brake drum 1 is shown in spaced relation to the primary brake shoe 3 and secondary brake shoe 17. The primary brake shoe webbing 4 is shown contacting a notch 33 in the lever 31. A similar notch 34 is provided for the reception of the secondary brake shoe webbing 20. In this view, the alignment pin 32 is shown extending between the two portions of the actuating lever 31. A portion of the lever 31 is shown broken away to more clearly illustrate the rolling action of the roller 35 against the arcuate surface 36 on the lever 30 for actuation of the secondary brake shoe. This roller 35 is mounted on a bushing 37 which, in turn, is supported by a rivet 38 mounted within the two links of the lever 31. The two sections of lever 31 receive the single section of lever 30 and are provided with a slight clearance for the pivoting action of the one member within the other. The levers 31 and 30 extend through an opening in the backing plate 2 to the external portion of the braking structure. The lever 30 is provided with a notch 39 for receiving the backing plate 2. The edge 40 in the opening of the backing plate 2 serves as a pivoting point for the lever 30. The lever 30 pivots against the secondary shoe webbing 20 to engage the secondary shoe with the inner periphery of the brake drum 1.

The lever 31 engages the primary brake shoe webbing 4 and also is provided with a rivet 42 on its opposite end which extends through the portions 43 and 44 of the lever 31. The push-rod 45 has a flat-sided portion and extends between the portions 43 and 44 of lever 31 and also receives a bushing 46 and rivet 42 to provide a pivoting connection between the push-rod 45 and the lever 31. This portion of the push-rod and the lever 31 is shown in cross section in FIGURE 4. These portions of the lever 31 also have formed thereon two flanges 47 on portion 43 and 48 on portion 44. These flanges provide a means for engaging the actuating link 49 which is actuated by the manual control means.

Figure 4:
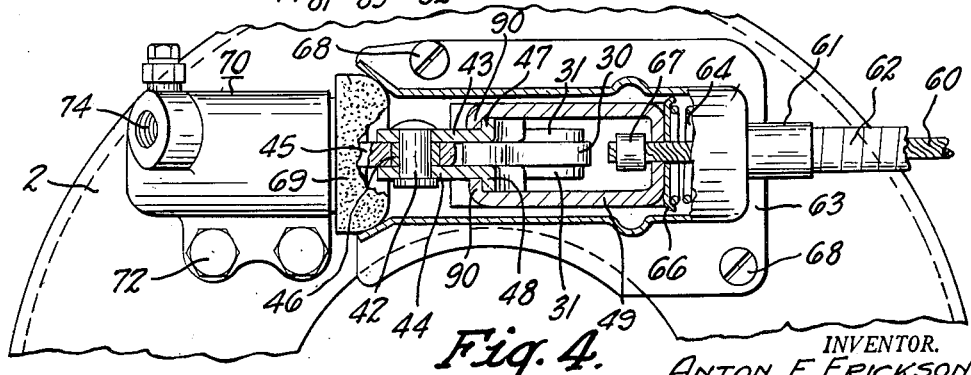
FIGURE 4 is a fragmentary cross section view taken on line 4—4 of FIGURE 2.

The actuating link 49 is shown in cross section in FIGURE 4 with the cable 60 extending through the link and the armored conduit 61. The armored conduit encloses the sheath portion 62 around the actuating cable adjacent to the point where it extends through the cover 63. The cable 60 extends externally to a manual control means, not shown, for providing a parking brake for the braking means.

The cover 63 encloses a return spring 64 which is compressibly mounted between spring retainers 65 and 66. The retainer 65 is mounted within an annular groove in the armored conduit portion 61 of the cable. The retainer 66 provides a seating means for the opposite ends of the return spring 64 where it abuts the actuating link 49. The cable also is provided with a lug 67 which is fastened to the inner end of the cable 60 and provides a means for transmitting the force from the cable to the actuating link 49.

The cover 63 is fastened to the backing plate by means of a plurality of screws 68. The cover 63 extends to a point adjacent to the boot 69 positioned on the hydraulic wheel cylinder 70.

The hydraulic wheel cylinder 70 is mounted on the backing plate 2 by means of a plurality of bolts such as 72 and also is assisted in its alignment by the embossment 73. An opening 74 is provided for the inlet of the hydraulic actuating fluid. Port 74 leads through the passage 75 to the fluid pressurizing chamber 76 within the hydraulic wheel cylinder 70. The hydraulic wheel piston 77 operates axially within the hydraulic wheel cylinder 70 and is provided with a seal 78 maintained in position by a return spring 79. The piston 77 is formed with a spherical depression 80 therein for reception of a semispherical head 81 of the push-rod 45. The push-rod 45 is provided with an annular recess 82 for reception of a mating ridge portion 83 on the boot 69. The outer periphery of the boot 69 is also provided with an annular ridge 84 for reception within an annular recess 85 on the outer periphery of the hydraulic wheel cylinder 70.

As the hydraulic wheel piston 77 moves axially within the hydraulic wheel cylinder 70, the push-rod 45 moves outward creating a rolling action on the pivotally connected lever 31.

Figure 5:
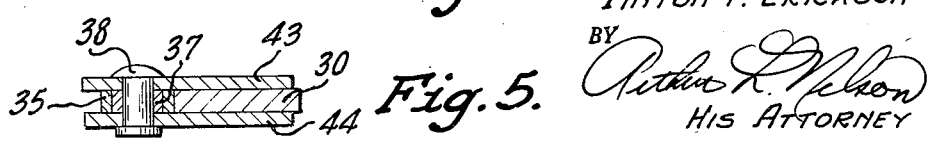
FIGURE 5 is a fragmentary cross section view taken on line 5—5 of FIGURE 2.

FIGURE 5 illustrates a cross-section view taken on line 5—5 of FIGURE 2. This view shows the rivet 38 fastening the two portions 43 and 44 of lever 31. The bushing 37 provides a spacing means with a slight clearance to receive lever 30 and permit pivoting movement between the levers 31 and 30. The bushing 37 is also seated within roller 35. Bushing 37 receives the rivet 38 in its mounting between the two portions 43 and 44 of lever 31.

The brake operates in the following described manner. As the hydraulic fluid is pressurized within the actuating chamber 76, the piston 77 moves axially within the hydraulic wheel cylinder 70. This movement carries the push-rod 45 in a general axial movement pivoting slightly relative to the lever 31. The lever 31 supports the roller 35 which is in constant contact with the arcuate surface 36 of the lever 30. As the push-rod moves generally in an axial manner relative to the hydraulic wheel cylinder 70, the roller 35 rolls on its contacting surface 36 forcing the external ends of levers 31 and 30 together. The notch 39 of lever 30 is in constant contact with the edge 40 of an opening in the backing plate 2. This maintains the position of the external end of lever 30 as the external end of lever 31 moves closer. The internal ends with the rotating brake drum of levers 30 and 31 move in an exapnding motion. Lever 31, being in constant contact with the primary webbing 4 of the primary shoe 3 by means of the notch 33 in lever 31 expands the shoe radially against the inner periphery of brake drum 1. A similar action is transmitted by the internal end of lever 30 through the notch 34 in the secondary brake shoe webbing 20. The expanding action causes the frictional material on the brake shoes to frictionally engage in the periphery of the rotating drum 1.

It is noted that the hydraulic wheel cylinder is of a single acting type and creates a thrust in a single direction. This thrust is in a general parallel direction to the facing of the backing plate. The action of the actuating levers 30 and 31 is a scissor-like action wherein the movement is not a true pivoting action relative to each other. The action is a rolling action of the roller contacting a smooth, rolling surface on the second member. The two levers 30 and 31 also are in a free-floating position and both levers pivotally contact the corresponding shoe. This construction provides for equal and opposite reaction on both brake shoes during their actuation and also a similar reaction regardless of rotation of the rotating drum. The single point of contact maintained by the lever arrangement with a stator member is the contact of lever 30 with the backing plate by its external portion. This contact, however, does not limit the equalized action of the internal end of lever 30 and 31 in actuating the brake shoes.

It is further shown that the hydraulic wheel cylinder 70 is mounted completely external of the rotating brake drum on the external side of the backing plate 2. This type of a mounting locates the hydraulic cylinder in a relatively cool position in comparison to a location within the rotating drum. The rotating drum is in spaced relation to the backing plate which serves as a support means for the hydraulic wheel cylinder. For this reason, the operating temperature of the fluid within the hydraulic wheel cylinder is much lower than any vehicle drum brake which employs a hydraulic cylinder mounted within any rotating brake drum.

The manual control means for actuation of the parking brake is provided through the cable 60. The cable 60 extends into the cover 63 and engages the actuating link 49. As the actuating link 49 is moved against the compression spring 64, the flange 90 engages the arcuate flanges 48 and 47. The rolling action of the levers 30 and 31 is similar to that when the links are actuated by a hydraulic means.

As the brakes are released in the manual position or in the hydraulic actuating position, the return springs 13 and 12 contract the brake shoes away from the rotating brake drum 1. This action contracts the internal portions of levers 30 and 31 and correspondingly expand the external portions of the same levers. The expanding action reduces the volume within the actuating chamber 76 within the hydraulic wheel cylinder 70.

The return spring 64 returns the actuating link 49 to its originally retracted position within the cover 63.

While the embodiments of the present invention as herein disclosed constitute preferred forms, it is to be understood that other forms might be adopted.

What is claimed is as follows:

1. A vehicle drum brake comprising in combination, a rotating brake drum, a backing plate mounted adjacent to said rotating brake drum, two shoes mounted within said rotating brake drum and adjacent to said backing plate for frictionally engaging the inner periphery of said rotating brake drum and having cooperative adjacent ends, a strut positioned between two of said cooperative adjacent ends of said brake shoes, an anchor pin mounted on said backing plate and positioned between the two opposite cooperative adjacent ends of said brake shoes, means for biasing said brake shoes to a retracted position, a scissors-like lever arrangement including a first lever, a roller, a connecting rod, said first lever having two portions held in spaced relation by said roller means and said connecting rod, said first mentioned lever pivotally contacting one of said two opposite cooperative adjacent ends of said brake shoes and extending externally of said brake means through an opening in said backing plate to pivotally connect to said rod of an external actuating means, a second lever pivotally contacting said second of said two cooperative adjacent ends of said brake shoes, a rolling contact surface on said second lever for said roller of said first mentioned lever, said second mentioned lever extending through said opening in said backing plate to pivotally contact a side of said opening to provide a pivotal contact of said second mentioned lever on said backing plate, said external actuating means mounted on the side of said backing plate opposite from said brake shoes, said actuating means contacting said connecting rod to produce a rolling action between first mentioned lever and said second mentioned lever on relative movement therebetween when said vehicle brakes are actuated.

2. A vehicle drum brake comprising in combination, a rotating brake drum, a backing plate mounted adjacent to said rotating brake drum, two brake shoes mounted within said rotating brake drum for frictionally engaging said rotating brake drum and having cooperative adjacent ends, a strut positioned between and contacting two of said cooperative adjacent ends of said brake shoes, an anchor pin mounted on said backing plate and positioned between said two opposite cooperative adjacent ends of said brake shoes, retraction means for maintaining a spaced relation between said brake shoes and said rotating brake drum when said brake shoes are in the retracted position, a force transmitting means positioned between said two opposite cooperative adjacent ends of said brake shoes including, a roller, a pivoting connector, a first lever pivotally contacting one of said brake shoes and having two portions held in spaced relation by said roller and said pivoting connector of an external actuating means, said first mentioned lever extending through said backing plate to a point of pivotal connection with said connector of said actuating means, a second lever pivotally contacting said second of said two opposite cooperative adjacent ends of said brake shoes, a smooth rolling surface on said second lever for contacting said roller on said first lever, said second lever extending through said backing plate and pivotally contacting a portion of said backing plate, said external actuating means mounted on the opposite side of said backing plate from said brake shoes, said actuating means operating through said pivoting connector of said first mentioned lever to effect a rolling action between said first lever and said second lever through said roller when said vehicle brakes are actuated.

3. A vehicle drum brake comprising in combination, a rotating brake drum, a backing plate mounted adjacent to said rotating brake drum, two brake shoes mounted for frictionally engaging said rotating brake drum and having cooperative adjacent ends, a strut connecting two of said cooperative adjacent ends of said brake shoes, an anchor pin mounted in said backing plate positioned between said two opposite cooperative adjacent ends of said brake shoes, retraction means connected to said brake shoes, an actuating means including two levers positioned between and pivotally contacting said two opposite cooperative adjacent ends of said brake shoes, a first of said two levers pivotally contacting one of said two opposite cooperative adjacent ends of said brake shoes, a roller, a push rod, said first lever having two portions held in spaced relation by said roller and said push rod, a second of said two levers positioned between said two portions of said first mentioned lever, a roller surface on said second lever adjacent to said roller of said first mentioned lever, said second lever pivotally contacting said second of said two opposite cooperative adjacent ends of said brake shoes and having a portion extending through an opening in said backing plate to a point where said second mentioned lever pivotally contacts said backing plate, said first mentioned lever extending through said opening in said backing plate to the point where said first mentioned lever pivotally connects said push rod, a hydraulic brake actuating means mounted on the external side of said backing plate and having a means for engaging said push rod, said hydraulic actuating means effecting a rolling action of said first lever relative to said second lever when said vehicle brakes are actuated.

4. A vehicle drum brake comprising in combination, a rotating brake drum, a backing plate mounted adjacent to said rotating brake drum, two brake shoes for frictionally engaging said rotating brake drum, said brake shoes having cooperative adjacent ends, a strut positioned between two of said cooperative adjacent ends, an anchor pin mounted on said backing plate positioned between two of said opposite adjacent ends of said brake shoes, a retraction means for biasing said brake shoes in spaced relation to said rotating drum when said vehicle brakes are in the retracted position, a lever arrangement positioned between two of said opposite cooperative adjacent ends of said brake shoes extending externally through an opening in said backing plate, said lever arrangement including, a roller, an external push rod, a first lever having two portions held in spaced relation by means of said roller and a pivotal connection of said external push rod, said first lever contacting the first of two opposite cooperative adjacent ends of said brake shoes, a second lever of said lever arrangement pivotally connecting the second of said two opposite cooperative adjacent ends of said brake shoes and extended externally through said backing plate to provide a pivotal contact between said second mentioned lever and said backing plate, a rolling surface on said second lever for contacting said roller, a hydraulic actuating means mounted on the external side of said backing plate and having connection with said push rod, said hydraulic actuating means producing a rolling rotational movement of said first mentioned lever relative to said second mentioned lever through said push rod actuating said first lever and thereby creating a transverse thrust to frictionally engage said brake shoes with the inner periphery of said rotating drum.

5. A vehicle drum brake comprising, in combination, a rotating brake drum, a brake support means adjacent said rotating brake drum, two brake shoes mounted within said rotating brake drum for frictionally engaging said rotating brake drum and having cooperative adjacent ends, a lever arrangement positioned between two of said cooperative adjacent ends of said brake shoes, a first lever of said lever arrangement pivotally contacting one of said two cooperative adjacent ends of said brake shoes, one of said two cooperative adjacent ends of said brake shoes having a guide pin therein to maintain a constant relative position between said first mentioned lever and said one end of said cooperative adjacent end of said brake shoes, said first mentioned lever including two portions held in spaced relation by a roller and pin assembly and a pivotal push rod connection, said roller forming a means for pivoting said first lever, a second lever of said lever arrangement mounted between said two portions of said first mentioned lever, a rolling surface on said second lever engaging said roller of said first mentioned lever, said second lever pivotally contacting said second of said two opposite cooeprative adjacent ends of said brake shoes and extending through an opening in said backing plate to pivotally contact a portion of said opening of said backing plate, a hydraulic actuating means placed on the external side of said backing plate and having connecting means to said push rod, said hydraulic actuating means thereby producing a rotating rolling action of said first lever relative to said second lever when said vehicle brakes are actuated.

References Cited in the file of this patent

UNITED STATES PATENTS

| | | |
|---|---|---|
| 2,140,741 | Goepfrich | Dec. 20, 1938 |
| 2,372,319 | Francois | Mar. 27, 1945 |
| 2,724,460 | Brooks | Nov. 22, 1955 |
| 2,758,680 | Rabe | Aug. 14, 1956 |

FOREIGN PATENTS

| | | |
|---|---|---|
| 692,797 | Germany | June 26, 1940 |
| 1,043,407 | France | June 10, 1953 |